(12) United States Patent
Renau (10) Patent No.: US 7,820,948 B1
(45) Date of Patent: Oct. 26, 2010

(54) BREWING MACHINE/SATELLITE CONTACTLESS POWER AND COMMUNICATION TRANSFER-ENABLING SYSTEM AND METHOD

(75) Inventor: Karol Renau, Calabasas, CA (US)

(73) Assignee: Renau Corporation, Chatsworth, CA (US)

( * ) Notice: Subject to any disclaimer, the term of this patent is extended or adjusted under 35 U.S.C. 154(b) by 1312 days.

(21) Appl. No.: 11/271,481

(22) Filed: Nov. 9, 2005

(51) Int. Cl.
H05B 1/02 (2006.01)
(52) U.S. Cl. ............. 219/494; 219/497; 219/506; 392/451; 392/465; 99/280
(58) Field of Classification Search ............ 219/494, 219/497, 499, 501, 506; 392/465, 451, 471; 99/280
See application file for complete search history.

(56) References Cited

U.S. PATENT DOCUMENTS

| | | | |
|---|---|---|---|
| 6,813,575 B2 * | 11/2004 | Laflamme | 702/99 |
| 7,157,669 B2 * | 1/2007 | Calis et al. | 219/482 |
| 7,659,493 B2 * | 2/2010 | Reusche et al. | 219/497 |
| 2008/0092746 A1 * | 4/2008 | Clark et al. | 99/281 |

* cited by examiner

Primary Examiner—Mark H Paschall
(74) Attorney, Agent, or Firm—Howard N. Sommers (57) ABSTRACT

The present invention provides a system for enabling control of the temperature of a receptacle in a satellite for containing a brewed fluid, so as to enable control of the temperature of the brewed fluid in the receptacle upon transfer of the brewed fluid from a brewing machine into the receptacle. The control of the temperature of the receptacle is responsive to contactless and wireless transfer of power and communication between the brewing machine and the satellite, and to generating, communicating, and processing fluid temperature measurement-enabling data between the brewing machine and the satellite, so as to enable control of the temperature of the brewed fluid.

23 Claims, 5 Drawing Sheets

BREWING MACHINE/SATELLITE CONTACTLESS POWER AND COMMUNICATION TRANSFER-ENABLING SYSTEM AND METHOD

BACKGROUND OF THE INVENTION

1. Field of the Invention

This invention is generally related to the transfer of power and communication between a brewing machine and a satellite, and more particularly, to an article and method for contactless brewing machine and satellite power and communication transfer for controlling the temperature of a brewed fluid.

2. General Background and State of the Art

A brewing machine, such as a commercial coffee brewing machine, includes components such as a tank, for example a four to five gallon fluid capacity tank, a heater, for heating the fluid in the tank, and a valve, such as a dump valve, which, upon opening thereof, enables heated fluid to flow by gravity through a spray head. At a single satellite station, or at each of multiple satellite stations, in the brewing machine, the heated fluid flows through a basket, which contains for example coffee beans, whereby the heated brewed fluid flows into a receptacle in the satellite where it accumulates. The brewed fluid in the satellite is heated to and maintained at a desired temperature by a heating element at each satellite station of the brewing machine, on which each satellite is positionable. The heated brewed fluid may then be served by being dispensed from the satellite as required.

However, initially, the satellite may be preheated, while the fluid may be processed in the brewing machine tank to a high temperature, as 180°, with the satellite being heated to a moderate temperature, as 50°. The brewed fluid, upon transfer to the satellite, may be heated to a medium heat of 100°, which would not be usable, requiring re-processing. Moreover, direct transfer of heat in the brewing machine from the heating element to the satellite, as at one-hundred fifty watts, is inefficient, and, if touched, may result in a burn.

Therefore, there has been identified a continuing need to provide a control system for enabling contactless transfer of power and communication between a brewing machine and a satellite, to control the temperature of a brewed fluid.

INVENTION SUMMARY

Briefly, and in general terms, the present invention, in a preferred embodiment, by way of example, is directed to a system for enabling control of the temperature of a receptacle in a satellite for containing a brewed fluid, so as to enable control of the temperature of the brewed fluid in the receptacle upon transfer of the brewed fluid from a brewing machine into the receptacle. The control of the temperature of the receptacle is responsive to contactless and wireless transfer of power and communication between the brewing machine and the satellite. The system further enables the generating, communicating, and processing of fluid temperature measurement-enabling data between the brewing machine and the satellite, so as to enable control of the temperature of the brewed fluid.

In accordance with other aspects of the invention, there is further provided a primary circuit in the brewing machine, including a controller for enabling setting of the temperature of the receptacle in the satellite. The primary circuit includes primary circuit elements for enabling contactless and wireless transferring of power and communication between the brewing machine and the satellite relating to control of the temperature of the receptacle in the satellite, and generating, communicating, and processing of fluid temperature measurement-enabling data between the brewing machine and the satellite, so as to enable control of the temperature of the brewed fluid. The system also includes a secondary circuit in the satellite. The secondary circuit includes secondary circuit elements for enabling detecting of the temperature of the receptacle, and contactless and wireless transferring of power and communication between the brewing machine and the satellite relating to control of the temperature of the receptacle, and generating, communicating, and processing of fluid temperature measurement-enabling data between the brewing machine and the satellite, so as to enable control of the temperature of the brewed fluid.

In other aspects of the invention, the system provides a transformer, for enabling the transfer of power and communication between the brewing machine and the satellite. The transformer includes a primary section in the primary circuit which includes a primary core and a primary coil, a secondary section in the secondary circuit which includes a secondary core and a secondary coil, and an air gap between the primary section and the secondary section which is formed upon positioning of the satellite in relation to the brewing machine.

In yet other aspects of the invention, the satellite is automatically pre-heated and held to the specific controller-set desired brewed fluid temperature, prior to, until, and while the fluid has been brewed and has been transferred thereinto.

In still other aspects of the invention, the air gap in the transformer increases the efficiency and prevents loss of power on the transfer of power and communication, enables full control of the fluid temperature, and a portion of the transformer in the brewing machine base section on which the satellite is positionable is warm but not hot to the touch.

These and other aspects and advantages of the invention will become apparent from the following detailed description and the accompanying drawings, which illustrate by way of example the features of the invention.

DETAILED DESCRIPTION OF THE PREFERRED EMBODIMENTS

Referring to the drawings, in which like reference numerals refer to like or corresponding parts, the control system 10 according to the invention enables control of the temperature of a receptacle 12 in a satellite 14 for containing a brewed fluid, so as to enable control of the temperature of the brewed fluid in the receptacle 12 upon transfer of the brewed fluid from a brewing machine 16 into the receptacle 12. The brewing machine 16 pre-heats the satellite 14 for the brewed fluid, such as coffee. The brewing machine 16 includes components such as a tank 18, for example a four to five gallon fluid capacity tank, and other components (not shown), including a heater, for heating the fluid in the tank 18, a valve, such as a dump valve, which, upon opening, enables heated fluid to flow by gravity through a spray head, and through a basket which contains for example coffee beans, whereby the brewed fluid flows from the brewing machine 16 into the satellite receptacle 12 where it accumulates. The system herein controls and holds the temperature of the brewed fluid in the satellite 14.

The brewing machine 16 includes a base section 20 which includes a top portion 22 on which the satellite 14 is positionable. The brewing machine also includes an alignment portion 24 in the top portion 22 of the base section 20. The satellite 14 includes a bottom portion 26 which is positionable on the top portion 22 of the brewing machine base section 20. The satellite 14 includes an alignment portion 28 in the bottom portion 26 thereof. The brewing machine alignment portion 24 and the satellite alignment portion 28 enable alignment between the brewing machine 16 and the satellite 14 within an off-center range of alignment thereof.

The control of the temperature of the receptacle 12 is responsive to contactless and wireless transfer of power and communication between the brewing machine 16 and the satellite 14, so as to enable control of the temperature of the brewed fluid. Temperature control of the receptacle 12, to enable temperature control of the brewed fluid, is further provided by generating, communicating, and processing fluid temperature measurement-enabling data between the brewing machine 16 and the satellite 14.

Figure 1:
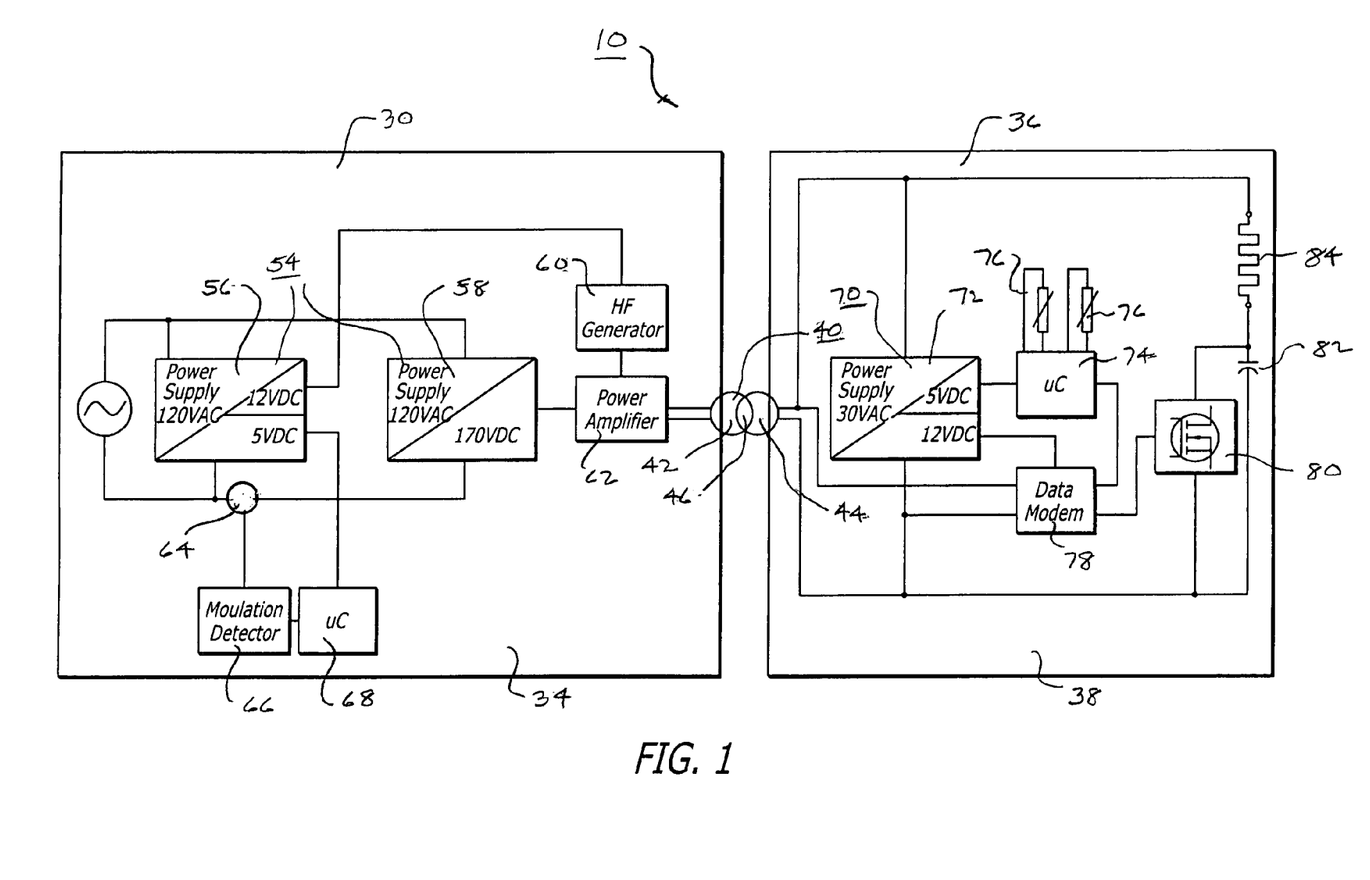
FIG. 1 is a circuit diagram of a primary circuit, a secondary circuit, and a transformer in accordance with aspects of the present invention.
Figure 2:
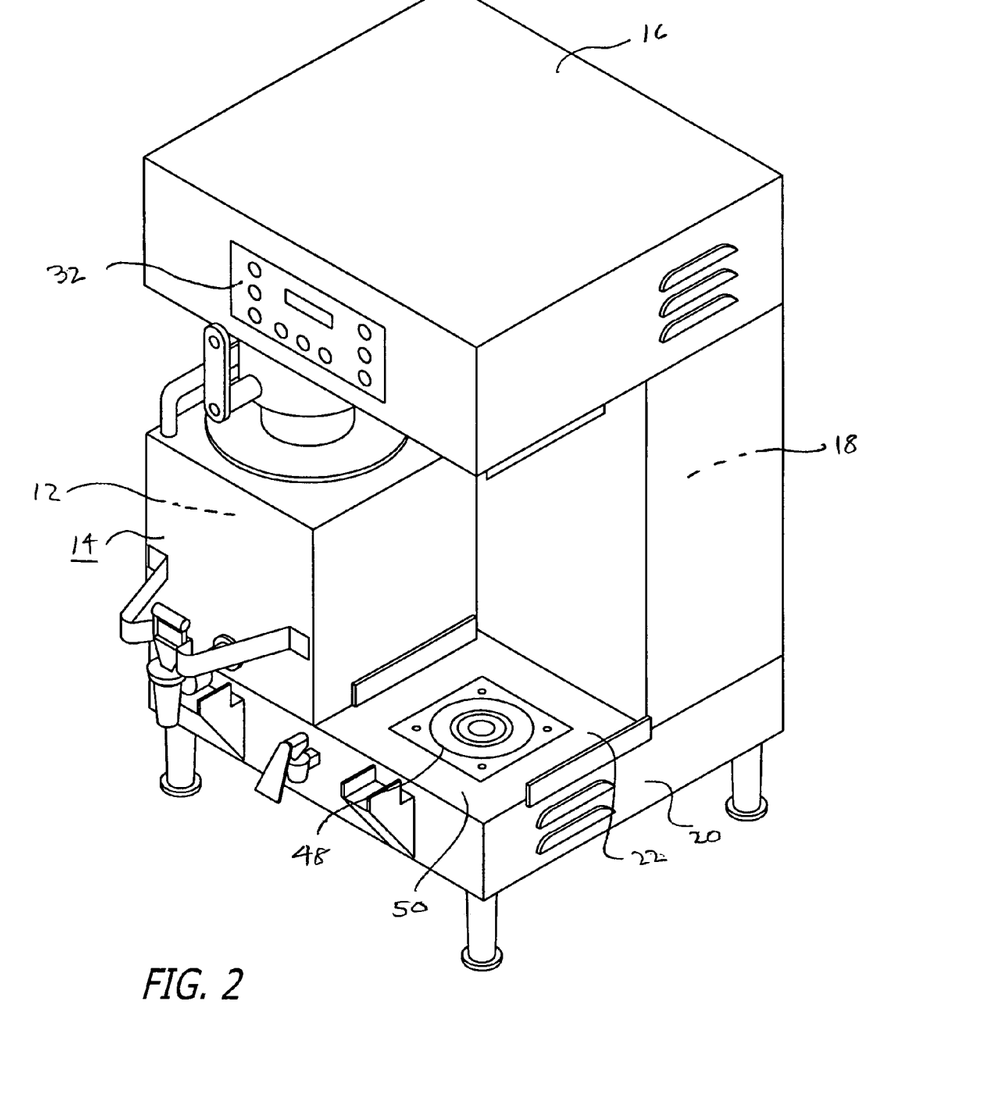
FIG. 2 is a perspective view of a brewing machine which includes a station at which a satellite is positioned and a station without a satellite positioned thereon.

FIG. 1 presents a control system 10 in accordance with the invention which includes a primary circuit 30 in the brewing machine 16, which also includes a controller 32 (FIG. 2) for enabling setting of the temperature of the receptacle 12 in the satellite 14. The primary circuit 30 also includes primary circuit elements 34 for enabling contactless and wireless transferring of power and communication between the brewing machine 16 and the satellite 14 relating to control of the temperature of the receptacle 12 in the satellite 14, and for generating, communicating, and processing fluid temperature measurement-enabling data between the brewing machine 16 and the satellite 14, so as to enable control of the temperature of the brewed fluid. The control system 10 further includes a secondary circuit 36 in the satellite 14, including secondary circuit elements 38 for enabling detecting of the temperature of the receptacle 12, contactless and wireless transferring of power and communication between the brewing machine 16 and the satellite 14 relating to control of the temperature of the receptacle 12, and generating, communicating, and processing of fluid temperature measurement-enabling data between the brewing machine 16 and the satellite 14, so as to enable control of the temperature of the brewed fluid.

Figure 5:
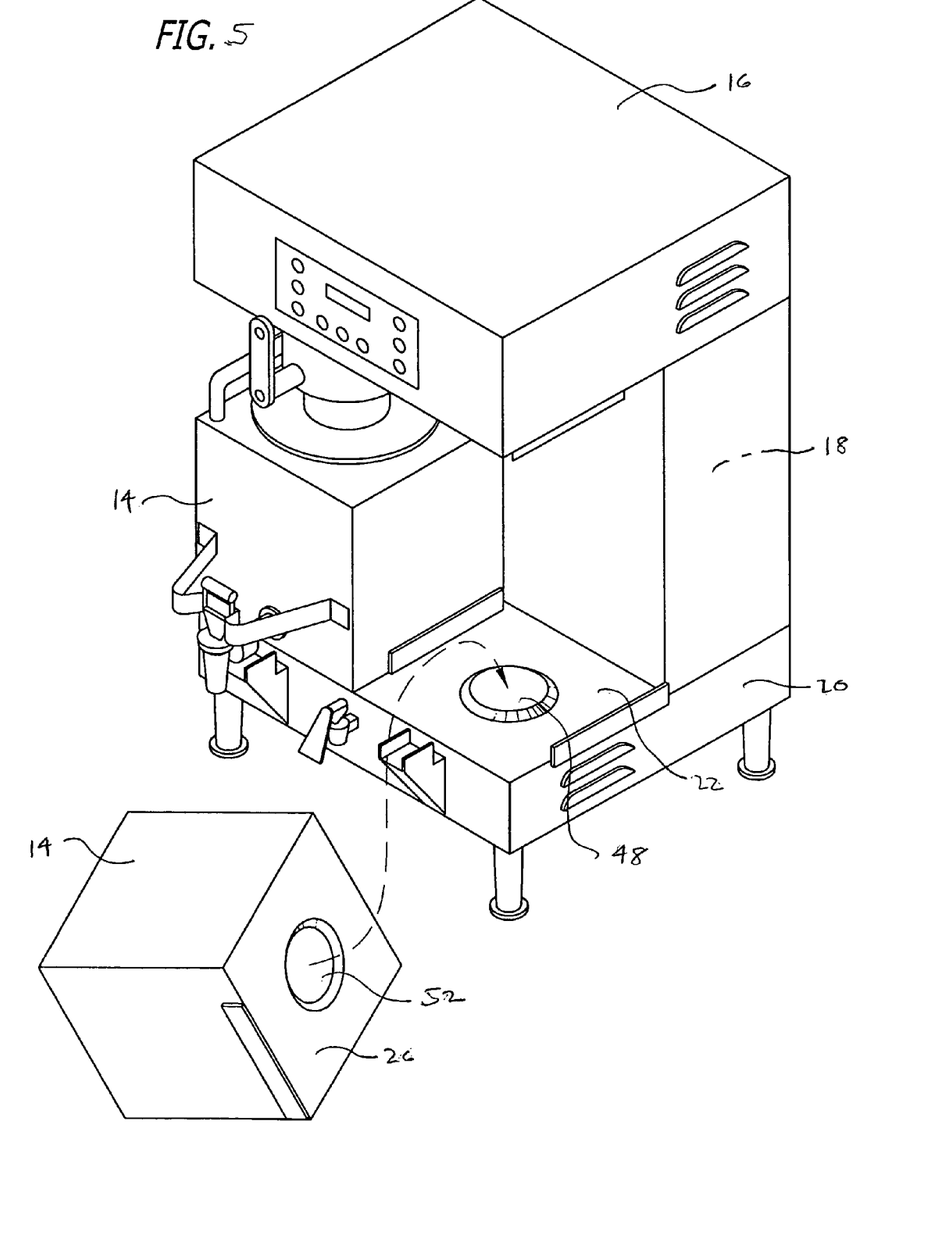
FIG. 5 is a perspective view of the brewing machine and the satellite in FIG. 1, including an inverted satellite positionable in a station of the brewing machine.

Referring to FIGS. 1 and 5, the control system 10 still further includes a transformer 40, for enabling the transfer of power and communication between the brewing machine 16 and the satellite 14. The transformer 30 may comprise a high frequency transformer. The transformer 30 includes a primary section 42 in the primary circuit 30 which includes a primary core and a primary coil, a secondary section 44 in the secondary circuit 36 which includes a secondary core and a secondary coil, and an air gap 46 between the primary section 42 and the secondary section 44, which air gap 46 is formed upon positioning of the satellite 14 in relation to the brewing machine 16. The primary section 42 of the transformer 40, connected to the primary circuit 30 in the brewing machine 16, is located in the top portion 30 of the base section 20 of the brewing machine 16, in the brewing machine alignment portion 28. The secondary section of the transformer 40, connected to the secondary circuit 36 in the satellite 14, is located in the bottom portion 26 of the satellite 14. A protrusion 48 in the top portion 22 of a station 50 in the brewing machine 16 at which the satellite 14 is to be located, and a complementary recess 52 in the bottom portion 46 of the satellite 14, are where the transformer primary and secondary are located.

In the transformer 40, the coil of the primary section 42 and the coil of the secondary section 44 comprise power and communication transfer media. The air gap 46 is variable within a range which enables the operation of the high frequency transformer 40. The range over which the air gap 46 is variable is several millimeters. The power is transferred through the air gap 46 between the primary circuit 30 and the secondary circuit 36. The air gap 46 increases the efficiency and prevents loss of power on the transfer of power and communication, enables full control of the fluid temperature, and the protrusion 48 in the brewing machine base section 20 is warm but not hot to the touch. The transfer of power from the primary circuit 30 to the secondary circuit 36 through the air gap 46 in the transformer 40 provides power to the satellite 14, and enables communication between the satellite 14 and the brewing machine 16. The transformer primary section 42 and secondary section 44 are alignable off-center within a range which enables the operation thereof. The primary coil and the secondary coil in the transformer 40 may be comprised of a multiplicity of very tiny wires such as Litz wires.

Figure 3:
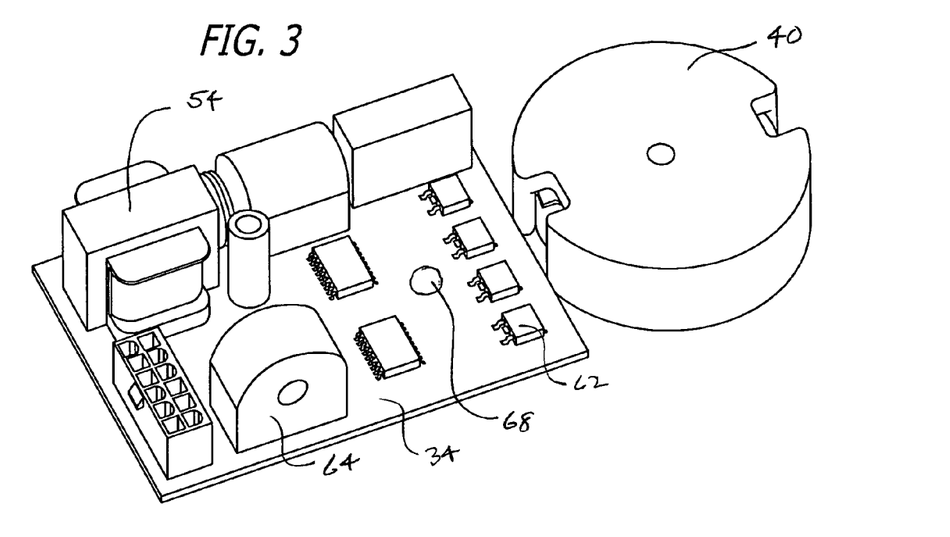
FIG. 3 is a top perspective view of primary circuit elements and a transformer in accordance with aspects of the present invention.
Figure 4:
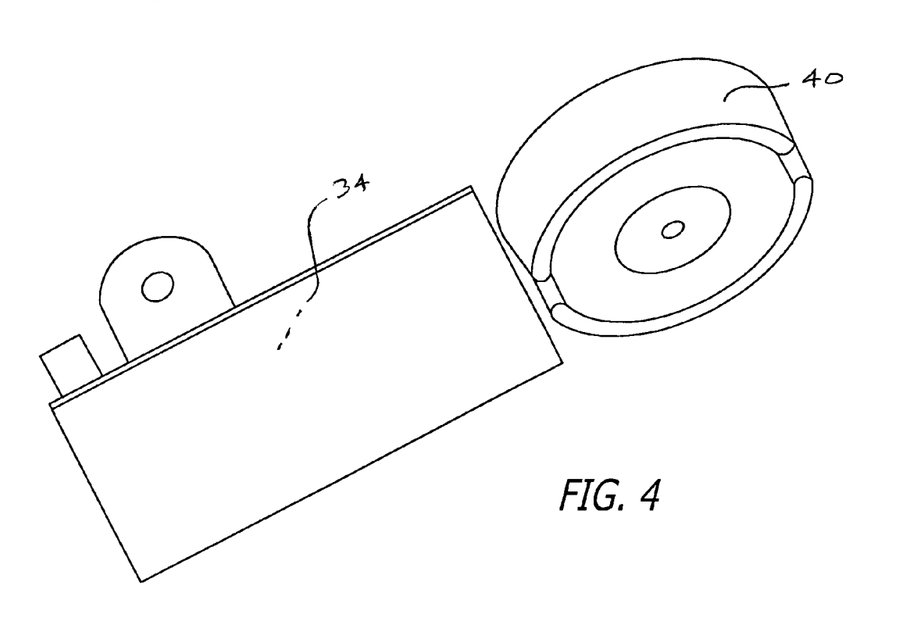
FIG. 4 is a bottom perspective view of the primary circuit elements and the transformer in FIG. 3.

There is shown in FIGS. 1 and 3-4 the primary circuit 30, which includes a power source 54, and sends power from the power source 54 through the transformer 40 to the secondary circuit 36. The primary circuit power source 54 includes a first power supply 56 and a second power supply 58. The first power supply 56 supplies power to a high frequency generator 60, a power amplifier 62, a current sensor 64, a modulation detector 66, and a microprocessor 68. The second power supply 58 provides power to the power amplifier 62. The generator 60 is at a high frequency, such as one-hundred twenty-five kilohertz. The microprocessor 68 in the primary circuit 30 turns the power on and off in the secondary circuit 36, through the power amplifier 62 which includes a preamplifier with drivers, and controls the first power supply 56 in the primary circuit 30.

The secondary circuit 36 is inside the satellite 14 and may be encapsulated. It includes a power source 70 which comprises a power supply 72. The power supply 72 supplies power to a microprocessor 74, sensors 76 including a temperature sensor and a level sensor, located outside of and sensing through the receptacle 12, a data modem 78, a metal-oxide-semiconductor-field-effect transistor (MOSFET) 80, a capacitor 82, and a heater element 84. The secondary circuit 36 also includes a power level detector for detecting the power level to receive information sent by the primary circuit 30 while the primary circuit 30 turns the power supplied to the transformer 40 on or off. The data modem 78 sends back a signal code. The microprocessor 74 controls the MOSFET 80.

The primary circuit 30 includes the microprocessor 68, and the secondary circuit 36 includes the pair of temperature sensors 76 positioned therein at separate locations, connected to the heating element outside the tank 18, and connected to the microprocessor 68, which enable the microprocessor 68 to generate a curve of the temperature increase which is dependent upon power supplied, responsive to temperature sensed by the temperature sensor 76, and to process the curve to determine the real average temperature of the tank 18 and the fluid level of the fluid contained in the tank 18 in the brewing machine 16. The primary circuit 30 further includes primary circuit elements 34 which operate as a master regulator for regulating the temperature of the tank and the level of fluid in the tank 18, and a master gauge for gauging the temperature of the tank and the level of the fluid in the tank 18 responsive to the processing by the microprocessor 66 of the temperatures sensed by the temperature sensor 76. The primary circuit 30 further includes secondary circuit elements 38 which operate as an error detector for checking the data stream from a data stream generator in the secondary circuit 36 in the satellite 14 for errors prior to processing the data stream in the primary microprocessor 68. The primary circuit 30 further includes the current sensor 64 which detects changes in current so as to be able to read the data stream from the secondary circuit 36.

The primary circuit 30 includes the primary power source 54 which is able to supply power to the primary circuit 30 and to the secondary circuit 36 upon positioning of the satellite 14 in relation to the brewing machine 16, and which for periods does not supply power to the secondary circuit 36. The secondary circuit 36 includes the secondary power source 70 for supplying power to the secondary circuit 36 during periods in which the primary power source does not supply power to the secondary circuit 36. The circuit elements on a printed-circuit board which may be encapsulated constitute a module.

The secondary circuit 36 includes a tuning circuit, for tuning the secondary circuit 36 to resonance or out of resonance, wherein power is transferred when the secondary circuit 36 is tuned to resonance, and communication is transferred when the secondary circuit 36 is out of resonance. The tuning circuit includes the capacitor 82 and the MOSFET 80. The capacitor 82 and the MOSFET 80 in the satellite 14 tune the secondary circuit 36 to resonance and out of resonance. The primary circuit 30 includes current which changes dependent upon whether the secondary circuit 36 is tuned to resonance or is out of resonance.

The tank 18 in the brewing machine 16 is filled with a fluid such as water. The satellite receptacle 12 includes an outer surface. It also includes a heating blanket which includes the heating element 84, which heating blanket may extend about the outer surface of the receptacle 12, and the temperature sensor 76 may be secured outside the receptacle 12. The secondary circuit elements 38 include the heating blanket, extendable about the outer surface of the receptacle 12, for enabling heating of the receptacle 12, and temperature sensor 76, connected to the heating blanket, for sensing the temperature of the heating blanket and the receptacle 12. The secondary circuit elements 38 include elements which operate as a data stream generator connected to the temperature sensors 76 for generating a data stream comprising the fluid temperature measurement-enabling data, and the data modem 78 for enabling the generated data stream to be transferred to the microprocessor 68. The brewing machine 16 includes the microprocessor 68 in the primary circuit 30 for providing an instruction to detect the temperature of the receptacle 12, and the satellite 14 includes the microprocessor 74 in the secondary circuit for receiving and implementing the instruction to detect the temperature of the receptacle 12, and for implementing the instruction through the temperature sensors 76 and the heating blanket. The secondary circuit 36 further includes elements which operate as a data stream generator, for generating a data stream comprising data relating to the temperature of the tank as detected by the microprocessor 74.

The control system 10 is further able to enable the control of the level of brewed fluid contained in the receptacle 12, and is further responsive to generating, communicating, and processing of fluid level measurement-enabling data between the brewing machine 16 and the satellite 14, so as to enable control of the level of the brewed fluid. The primary circuit elements 34 and the secondary circuit elements 38 are further able to enable contactless and wireless transferring of power and communication between the brewing machine 16 and the satellite 14 relating to control of the level of the brewed fluid contained in the receptacle 12.

Figure 6:
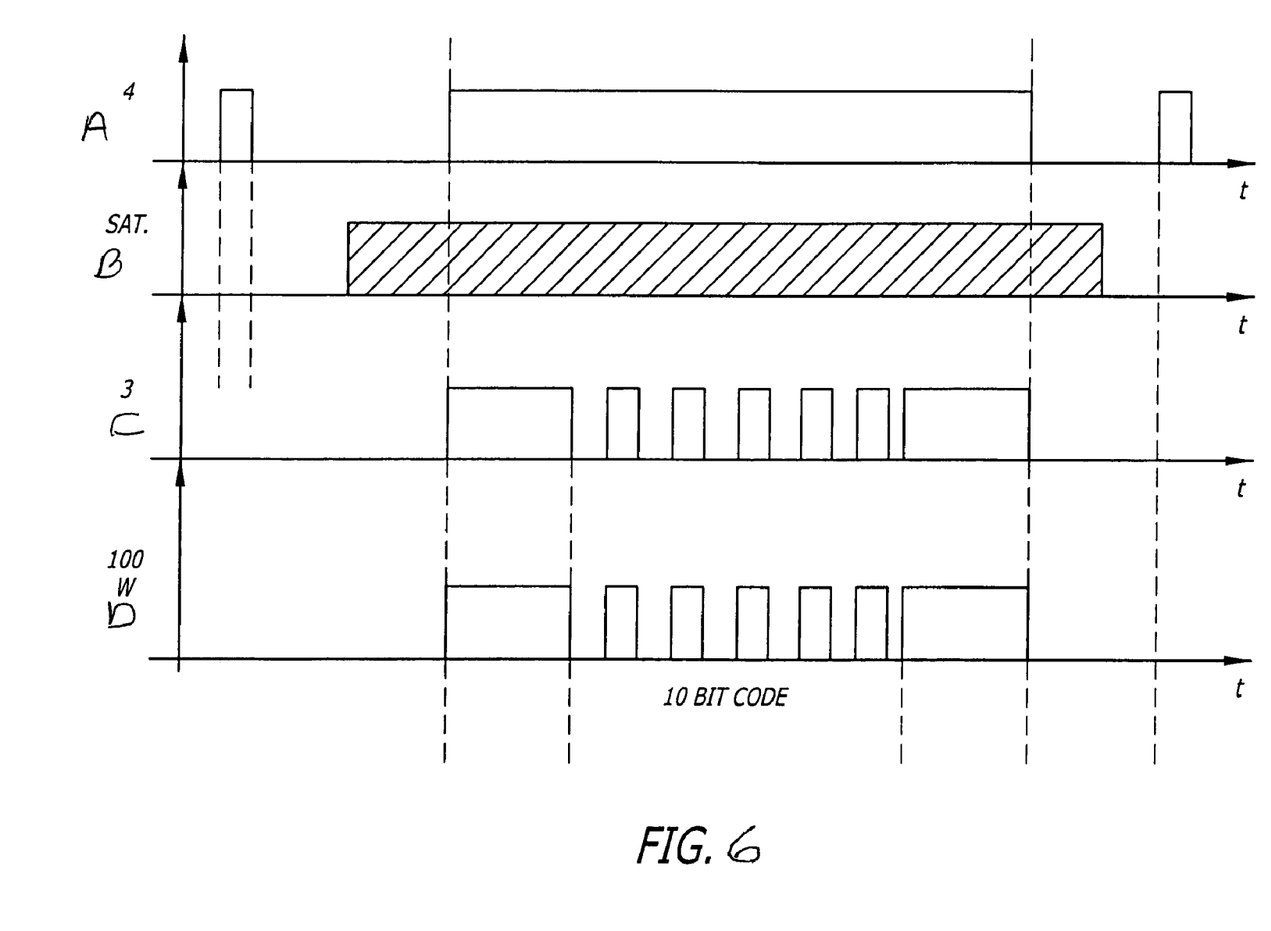
FIG. 6 includes Graphs A, B, C, and D which relate to operations of the control system herein.

In FIG. 6, Graph A shows time (x axis) versus current (y axis) from the power source 54 at the power amplifier 62. The power is switched on in the primary circuit 30, which shoots short pulses, as for one-hundred milliseconds, to determine whether the secondary circuit 36 is on. No power is applied if there is no satellite 12 positioned at a station 50 or if the secondary circuit 36 is not on, and full power is applied if there is a satellite 12 positioned at a station 50 and the secondary circuit 36 is on. After the pulse is sent, if the secondary circuit 36 is not on, then there is no current for a period, such as five seconds. Once the secondary circuit power is turned on, the current shows up immediately, indicating that the secondary circuit is on (Graph B). The secondary circuit is energized, such that the microprocessor 74 has power, and it is energized for a period, such as five-hundred milliseconds, to detect data, and to measure the temperature. One sensor 76 is for detecting fluid level, the other sensor 76 is for detecting fluid temperature. The energized secondary circuit 36 is then supplying the microprocessor 74, detecting the temperature, sending back the data to the primary as to the temperature, after a pulse, and how much power to supply, so as to step up the temperature incrementally, such as by two degrees. Pulses are sent from the primary circuit 30 to the secondary circuit 36. If nothing is sensed, nothing is turned on.

In Graph C, once the secondary circuit 36 is on, the current at the temperature sensor 76 over time is on for a period, as five-hundred milliseconds, to provide time for the circuit to measure the temperature, and if the temperature is where it is set by the controller 32, the circuit starts cutting off power on the heater element 84. In Graph D, a code, such as a ten bit code, which for example may provide measurements of temperature in two degree steps in a range of 160°-200° Fahrenheit, is sent over time, such as two-hundred milliseconds, to the controller 32, by voltage going up and down for the time. If the code is read, the primary circuit 30 then knows the temperature in the secondary circuit 36, and the microprocessor 68 decides what to do with the power. The primary circuit 30 starts to cut off power to the secondary circuit 36. If the temperature is too low, the power is kept on to incrementally heat the fluid to the set temperature. If the temperature is too high, the power is turned off, and the next cycle begins after the frame cycle time, as five seconds. In the MOSFET 80 circuit, including the MOSFET 80 and the capacitor 82, upon being taken out of resonance, pulses are generated to send the data back to the primary circuit 30. When the power is applied, the system is at full power. The primary circuit is notified by cutting the current from high to low through the MOSFET 80. The heat is supplied at the heating element 84, at a frequency for example of one-hundred twenty-five kilohertz, as in Graph D in FIG. 6.

Upon programming the brewing machine 16, the pre-set data temperature is transferred to the microprocessor 68 in the brewing machine 16, and the microprocessor 74 in the satellite 14, whereby if the satellite 14 is placed elsewhere, it will keep the temperature at the preset value, due to its internal power supply and its internal memory. The pre-set is flexibly adjustable to any desired temperature. Initially, the satellite 14 is preheated, while the fluid would be processed and brewed to a high temperature, as 180°, the satellite would be heated to a moderate temperature, as 50°, the brewed fluid upon transfer to the satellite 14 would be heated to a medium heat of 100° which would not be usable, requiring re-processing. Here, the satellite 14 is automatically pre-heated and holding to the specific controller-set desired brewed fluid temperature, prior to, until, and while the fluid has been brewed and has been transferred thereinto.

After serving the brewed fluid by pouring it from the satellite 14, any remainder of brewed fluid will be maintained at the pre-set desired temperature for re-use, instead of being burned or going cold. The system is programmable through a menu in the controller 32 on the control panel from outside the system without requiring access thereinto, enabling changes in the set temperature over a range, as 160° to 200°, whereby the data is transferred to the satellite 14.

While the particular control system as shown and disclosed in detail herein is fully capable of obtaining the objects and providing the advantages previously stated, it is to be understood that it is merely illustrative of the presently preferred embodiment of the invention, and that no limitations are intended to the details of construction or design shown herein other than as described in the appended claims.

I claim:

1. A system for enabling control of the temperature of a receptacle in a satellite for containing a brewed fluid, so as to enable control of the temperature of the brewed fluid in the receptacle upon transfer of the brewed fluid from a brewing machine into the receptacle, wherein the control of the temperature of the receptacle is responsive to contactless and wireless transfer of power and communication between the brewing machine and the satellite, and to generating, communicating, and processing fluid temperature measurement-enabling data between the brewing machine and the satellite, so as to enable control of the temperature of the brewed fluid, comprising;

a primary circuit in the brewing machine, including a controller for enabling setting of the temperature of the receptacle in the satellite, and primary circuit elements for enabling contactless and wireless transferring of power and communication between the brewing machine and the satellite relating to control of the temperature of the receptacle in the satellite, and generating, communicating, and processing of fluid temperature measurement-enabling data between the brewing machine and the satellite, so as to enable control of the temperature of the brewed fluid; and a secondary circuit in the satellite, including secondary circuit elements for enabling detecting of the temperature of the receptacle, and contactless and wireless transferring of power and communication between the brewing machine and the satellite relating to control of the temperature of the receptacle, and generating, communicating, and processing of fluid temperature measurement-enabling data between the brewing machine and the satellite, so as to enable control of the temperature of the brewed fluid.

2. A system as in claim 1, further comprising a transformer, for enabling the transfer of power and communication between the brewing machine and the satellite, including a primary section in the primary circuit which includes a primary core and a primary coil, a secondary section in the secondary circuit which includes a secondary core and a secondary coil, and an air gap between the primary section and the secondary section which is formed upon positioning of the satellite in relation to the brewing machine.

3. A system as in claim 1, further able to enable the control of the level of brewed fluid contained in the receptacle, and further responsive to generating, communicating, and processing of fluid level measurement-enabling data between the brewing machine and the satellite, so as to enable control of the level of the brewed fluid, and wherein the primary circuit elements and the secondary circuit elements are further able to enable contactless and wireless transferring of power and communication between the brewing machine and the satellite relating to control of the level of the brewed fluid contained in the receptacle.

4. A system as in claim 1, wherein the secondary circuit includes a tuning circuit, for tuning the secondary circuit to resonance or out of resonance, wherein power is transferred when the secondary circuit is tuned to resonance, and communication is transferred when the secondary circuit is out of resonance.

5. A system as in claim 1, wherein the receptacle includes an outer surface, the secondary circuit elements include a heating blanket, extendable about the outer surface of the receptacle, for enabling heating of the receptacle, a temperature sensor, connected to the heating blanket, for sensing the temperature of the heating blanket and the receptacle, a data stream generator connected to the temperature sensor for generating a data stream comprising the fluid temperature measurement-enabling data, and a data modem for enabling the generated data stream to be transferred to the primary controller.

6. A system as in claim 1, wherein the primary circuit includes a primary power supply which is able to supply power to the primary circuit and to the secondary circuit upon positioning of the satellite in relation to the brewing machine, and which for periods does not supply power to the secondary circuit, and wherein the secondary circuit includes a secondary power supply for supplying power to the secondary circuit during periods in which the primary power supply does not supply power to the secondary circuit.

7. A system as in claim 2, wherein the primary coil and the secondary coil comprise power and communication transfer media.

8. A system as in claim 2, wherein the transformer comprises a high frequency transformer.

9. A system as in claim 2, wherein the primary circuit includes a power source and sends power from the power source through the transformer to the secondary circuit, and the secondary circuit includes a power level detector for detecting the power level to receive information sent by the primary circuit while the primary circuit turns the power supplied to the transformer on or off.

10. A system as in claim 2, wherein the air gap is variable within a range which enables the operation of the high frequency transformer.

11. A system as in claim 2, wherein the transformer primary section and secondary section are alignable off-center within a range which enables the operation thereof.

12. A system as in claim 2, wherein the primary coil and the secondary coil are comprised of Litz wires.

13. A system as in claim 2, wherein the brewing machine includes a base section which includes a top portion on which the satellite is positionable, the satellite includes a bottom portion which is positionable on the brewing machine base section top portion, the brewing machine includes an alignment portion in the top portion of the base section, the transformer primary section is located in the brewing machine alignment portion, the satellite includes an alignment portion in the top portion thereof, the transformer secondary section is located in the satellite alignment portion, and the brewing machine alignment section and the satellite alignment section enable alignment between the brewing machine and the satellite within an off-center range of alignment thereof.

14. A system as in claim 4, wherein the tuning circuit includes a capacitor and a MOSFET, and the capacitor and MOSFET in the satellite tune the secondary circuit to resonance and out of resonance.

15. A system as in claim 4, wherein the primary circuit includes current which changes dependent upon whether the secondary circuit is tuned to resonance or is out of resonance.

16. A system as in claim 5, wherein the brewing machine includes a primary controller in the primary circuit for providing an instruction to detect the temperature of the receptacle, and the satellite includes a secondary controller in the secondary circuit for receiving and implementing the instruction to detect the temperature of the receptacle, and for implementing the instruction through the temperature sensor and the heating blanket.

17. A system as in claim 5, wherein the primary circuit includes a primary controller, the secondary circuit includes a pair of temperature sensors positioned therein at separate locations, connected to the heating element outside the receptacle, and connected to the primary controller, which enable the primary controller to generate a curve of the temperature increase which is dependent upon power supplied, responsive to temperature sensed by the pair of temperature sensors, and to process the curve to determine the real average temperature of the receptacle and the fluid level of the brewed fluid contained in the receptacle.

18. A system as in claim 10, wherein the range over which the air gap is variable is several millimeters.

19. A system as in claim 16, wherein the secondary circuit further includes a data stream generator, for generating a data stream comprising data relating to the temperature of the receptacle as detected by the secondary controller.

20. A system as in claim 17, wherein the primary circuit further includes a master regulator for regulating the temperature of the receptacle and the level of brewed fluid in the receptacle, and a master gauge for gauging the temperature of the receptacle and the level of a brewed fluid in the receptacle responsive to the processing by the primary controller of the temperatures sensed by the temperature sensors.

21. A system as in claim 17, wherein the primary circuit further includes an error detector for checking the data stream from the data stream generator in the secondary circuit in the satellite for errors prior to processing the data stream in the primary controller.

22. A system as in claim 17, wherein the primary circuit further includes a current sensor which detects changes in current so as to be able to read the data stream from the secondary circuit.

23. A system for enabling control of the temperature of a receptacle in a satellite for containing a brewed fluid, so as to enable control of the temperature of the brewed fluid in the receptacle upon transfer of the brewed fluid from a brewing machine into the receptacle, wherein the control of the temperature of the receptacle is responsive to contactless and wireless transfer of power and communication between the brewing machine and the satellite, and to generating, communicating, and processing fluid temperature measurement-enabling data between the brewing machine and the satellite, so as to enable control of the temperature of the brewed fluid, comprising;

primary circuit means in the brewing machine, including controller means for enabling setting of the temperature of the receptacle in the satellite, and primary circuit element means for enabling contactless and wireless transferring of power and communication between the brewing machine and the satellite relating to control of the temperature of the receptacle in the satellite, and generating, communicating, and processing of fluid temperature measurement-enabling data between the brewing machine and the satellite, so as to enable control of the temperature of the brewed fluid; and secondary circuit means in the satellite, including secondary circuit element means for enabling detecting of the temperature of the receptacle, and contactless and wireless transferring of power and communication between the brewing machine and the satellite relating to control of the temperature of the receptacle, and generating, communicating, and processing of fluid temperature measurement-enabling data between the brewing machine and the satellite, so as to enable control of the temperature of the brewed fluid.

* * * * *